United States Patent [19]

Ise et al.

[11] Patent Number: 4,623,154
[45] Date of Patent: Nov. 18, 1986

[54] CENTER CHUCK ASSEMBLY

[75] Inventors: Yoji Ise; Tomeo Konishi, both of Tokyo, Japan

[73] Assignee: Tokuken Ltd., Tokyo, Japan

[21] Appl. No.: 594,362

[22] Filed: Mar. 28, 1984

[30] Foreign Application Priority Data

Mar. 29, 1983 [JP] Japan ................................. 58-45025

[51] Int. Cl.$^4$ ............................................. B23B 5/22
[52] U.S. Cl. .................................. 279/1 L; 279/114; 279/123
[58] Field of Search ........... 279/1 L, 114, 115, 1 ME, 279/123

[56] References Cited

U.S. PATENT DOCUMENTS 1,082,590 12/1913 Hartness ............................... 279/115
1,491,332 4/1924 Brown .................................. 279/1 L

FOREIGN PATENT DOCUMENTS 770670 10/1980 U.S.S.R. ............................... 279/1 L
795740 1/1981 U.S.S.R. ............................... 279/1 L
895593 1/1982 U.S.S.R. ............................... 279/1 L
994147 2/1983 U.S.S.R. ............................... 279/1 L

Primary Examiner—E. R. Kazenske
Assistant Examiner—Willmon Fridie, Jr.
Attorney, Agent, or Firm—Robert E. Burns; Emmanuel J. Lobato; Bruce L. Adams

[57] ABSTRACT

A center chuck assembly for rotatably supporting the end of a cylindrical workpiece comprises a shaft rotatable in a mounting pipe to be mounted on a receiving member and having an operating flange and a disc formed on the outer end thereof. The disc has a spiral groove on the end surface thereof. A chuck holding member having chuck members slidably fitted within holes formed radially in the chuck holding member, is rotatably fitted on the disc of the rotating shaft. The chuck members have teeth on one side thereof, and these teeth engage with the spiral groove on end surface of the disc. By rotating the operation flange relative to the chuck holding member, the chuck members are caused to project outwardly by means of engagement of said teeth and spiral groove and to abut the inside surface of the workpiece at a position spaced from the end of the workpiece, thereby supporting the workpiece securely. By using this center chuck assembly, end surface of the workpiece can be machined easily in one process.

4 Claims, 4 Drawing Figures

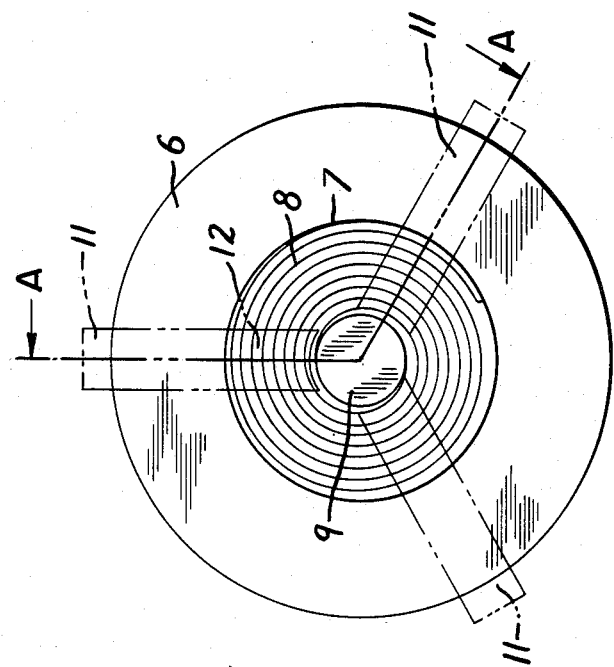
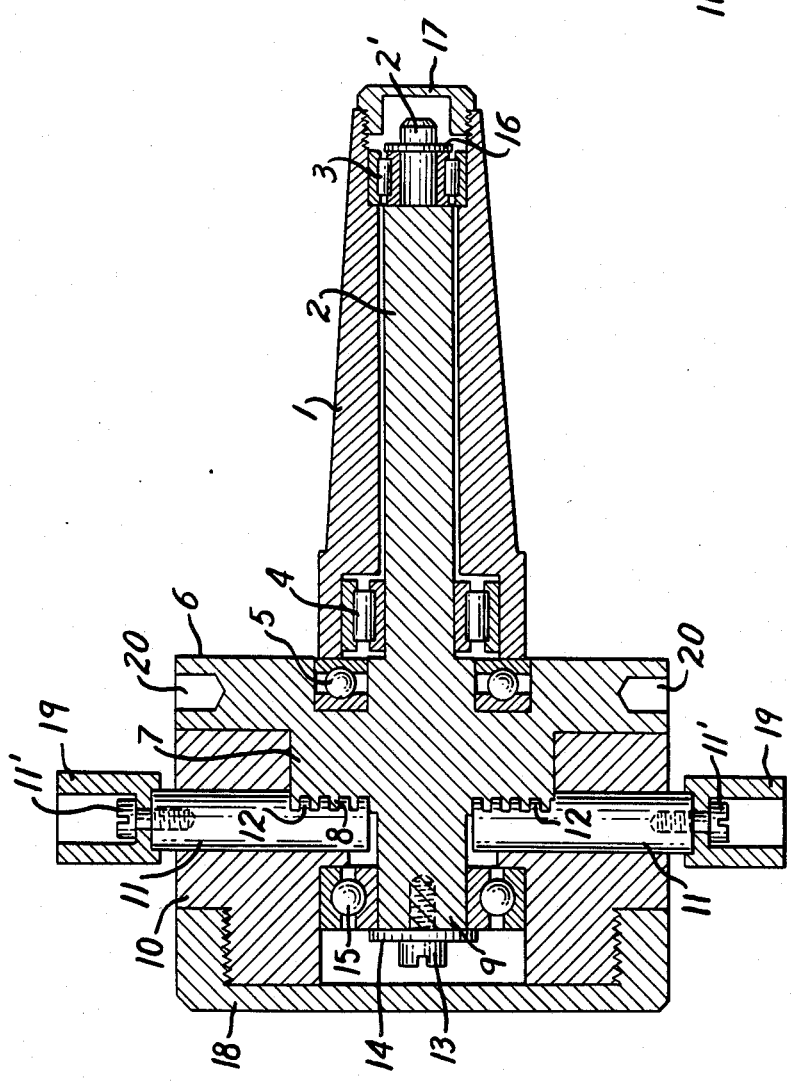
FIG. 2
FIG. 1

CENTER CHUCK ASSEMBLY

BACKGROUND OF THE INVENTION

This invention relates to a center chuck assembly to be used for supporting the end of the cylindrical body rotatably, and more particularly to the kind which is attached to the tail stock of a lathe and supports the free end of cylindrical works of large diameter while the same being turned.

In the prior art, a center chuck of conical shape is generally used, and this is pushed against the open end of the works for holding the same.

However, with this conventional type of the chuck, it is difficult to machine the end surface of the cylindrical works, so that another supporting means is used to hold middle portion of the works, and then the end surface is machined after removing the center chuck, and this may require troublesome operation and decrease work efficiency.

Accordingly it is an object of the present invention to provide a center chuck assembly which may overcome such problems as described above.

SUMMARY OF THE INVENTION

A center chuck assembly of the present invention comprises; a mounting pipe adapted to be mounted on a receiving member such as tail stock of the lathe; a rotating shaft rotatably fitted in said mounting pipe, said rotating shaft having an operating flange and a disc on the projecting end thereof, said disc having a spiral groove on its end surface; and a chuck holding member fitted rotatably on said disc, said chuck holding member having chuck members fitted slidably within holes formed radially and substantially equally spaced on said chuck holding member, each of said chuck members having teeth on one side thereof to engage with said groove on said disc of said rotating shaft; and is adapted to support cylindrical works by said chuck members which project outward to engage with the inside surface of said cylindrical works, by turning said operating flange against said chuck holding member.

Thus according to the present invention, a center chuck assembly may be provided which can support the large cylindrical works securely on the position during the lathe work. Also, machining of the end surface of the works may be made possible by using this center chuck assembly.

In one embodiment of the present invention, said operating flange and disc are formed in one member with said rotating shaft, and in another embodiment, said operating flange and disc are formed in a separate member and connected to said rotating shaft so as to be fixed eccentrically with respect to said rotating shaft. This type of center chuck assembly may be used for eccentric machining of the works.

BRIEF DESCRIPTION OF THE DRAWINGS

FIG. 1 is a cross-sectional view of an embodiment of the present invention, taken along line A—A of FIG. 2;

FIG. 2 is a front view illustrating a disc portion of the rotating shaft of the center chuck assembly shown in FIG. 1;

DESCRIPTION OF THE PREFERRED EMBODIMENT

Figures 3, 4:
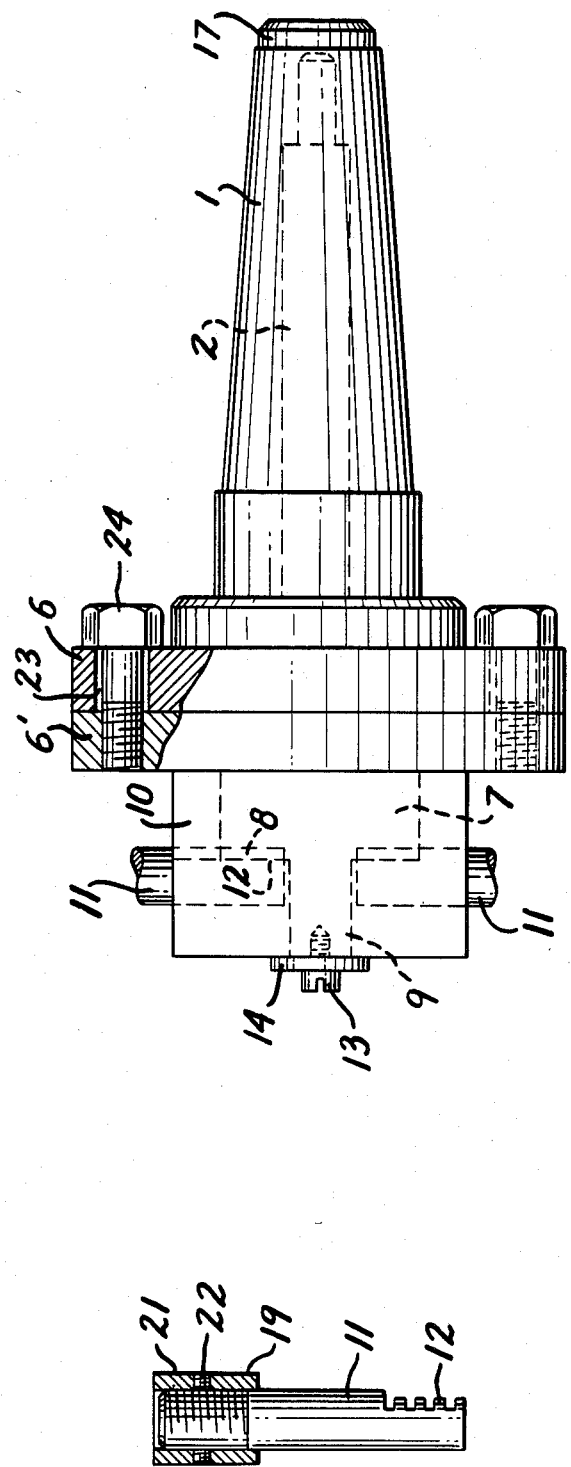
FIG. 3 is a side elevational view of a chuck member of another embodiment.
FIG. 4 is a partly broken side elevational view of another embodiment of the center chuck assembly of the present invention.

Referring now to the drawings, a center chuck assembly shown in FIGS. 1 and 2 includes a mounting pipe 1 which has a tapered outer surface and is adapted to be mounted on the tail stock of the lathe. A rotating shaft 2 is rotatably fitted within said mounting pipe 1 by means of bearings 3, 4 and 5.

The rotating shaft 2 has an operating flange 6 and a disc 7 formed respectively on the projecting end of said rotating shaft 2. Said disc 7 has a spiral groove 8 on its end surface and also provided with a supporting shaft or hub portion 9 projecting from the center portion of said disc 7.

A chuck holding member 10 is rotatably fitted on the outside surface of said disc 7. The chuck holding member 10 has substantially equally spaced three radially bored holes to receive pin shape chuck members 11 slidably.

Each of the chuck members 11 has a flat surface on one side thereof and provided with teeth 12 thereon to engage with said groove 8 of the disc 7. The chuck holding member 10 is supported by the supporting shaft 9 through a bearing 15 and is retained by a washer 14 and bolt 13 which is secured on the end of the supporting shaft 9. The other end of the rotating shaft 2 is retained by the snap ring 16 which is attached to the shaft 2 and engages with the bearing 3. 17 and 18 are caps attached to the open end of the mounting pipe 1 and chuck holding member 10 respectively. 19 are tips replaceably attached on the outer end of the chuck member 11 by bolts 11'. Tips 19 of suitable length may be used according to the inside diameter of the works.

In case of using this center chuck assembly, the mounting pipe 1 is fitted within the tail stock of the lathe and the chuck holding member 10 is inserted into the open end of the cylindrical works which is mounted on the head stock at the other end, and by turning operating flange 6 against chuck holding member 10, chuck members 11 project outward by means of said teeth 12 and groove 8 engagement, and abut to the inside surface of the works so that the same can support the works securely. Thus the works can be machined by turning the same and operating the carriage of the lathe. As the chuck members 11 engage with the inside surface of the works at the position apart from the open end thereof, end surface of the works can be machined in one process without removing the center chuck assembly. By rotating the operating flange 6 in the opposite direction, the chuck members 11 retract, so that the center chuck assembly can be removed from the works. In FIG. 1, 20 are holes provided on the outer surface of the operating flange 6 for engaging operating tools such as wrenches to be used for rotating the operating flange 6. Similar holes may be provided on the chuck holding member 10.

FIG. 3 shows another form of the chuck member 11, in which the tip 19 is attached on the outer end of the chuck member 11 by the screw engagement, so that the amount of projection of the chuck member 11 can be adjusted according to the surface conditions of the works by turning said tip 19.

FIG. 4 shows another embodiment of the present invention in which the operating flange 6' and disc 7 are formed in a separate member and the operating flange 6' is connected to a flange 6 formed on the end of the rotating shaft 2 by bolts 24 which penetrate large mounting hole 23 of the flange 6 and screwed into the threaded hole formed on the operating flange 6' so that the chuck portion can be fixed eccentrically with respect to the rotating shaft 2. This type of center chuck assembly may be used for eccentric machining of the works.

As described above, the center chuck assembly of the present invention can support the end of the cylindrical works of large diameter securely and the end surface of the works can be machined in one process without removing the center chuck assembly.

What is claimed is:

1. A center chuck assembly for supporting for rotation a cylinder workpiece having an open end and an inner peripheral surface extending inwardly from said open end, said center chuck assembly comprising a mounting pipe adapted to be mounted on a receiving member, a shaft rotatable in said pipe, a flange on an outer end of said shaft, a disc portion on an outer face of said flange, said disc portion having a spiral groove on its outer face, a central hub portion extending beyond said disc portion, said flange, said disc portion and said central hub portion being integral with said shaft, an annular chuck holding member rotatable on said hub portion and disc portion, said chuck holding member having a plurality of radial holes extending in to said disc portion and hub portion, and a plurality of chuck members radially slidable in said radial holes respectively, said chuck members having outer end portions projecting radially outwardly of said chuck holding member and inner end portions having teeth engaging said spiral groove on the outer face of said disc portion, whereby said chuck members are movable outwardly by rotation of said chuck holding member relative to said disc portion for engagement of said radially projecting outer end portions with the inner peripheral surface of said workpiece at a position spaced inwardly from said open end.

2. A center chuck assembly according to claim 1, in which work engaging members are removably and interchangeably secured on outer ends of said chuck members.

3. A center check assembly according to claim 1, in which said outer end portions of said chuck members are threaded and internally threaded work engaging members are screwed onto said threaded outer end portions of said chuck members, whereby the radial position of said work engaging members, relative to respective chuck members is variable.

4. A center chuck assembly for supporting for rotation a cylindrical workpiece having an open end and an inner peripheral surface extending inwardly from said open end, said center chuck assembly comprising a mounting pipe adapted to be mounted on a receiving member, a shaft rotatable in said pipe, a flange on an outer end of said shaft, a disc portion on an outer face of said flange, said disc portion having a spiral groove on its outer face, a central hub portion extending beyond said disc portion, said flange, said disc portion and said central hub portion being mounted on said shaft for variable eccentricity relative to said shaft, an annular chuck holding member rotatable on said hub portion and disc portion, said chuck holding member having a plurality of radial holes extending in to said disc portion and hub portion, and a plurality of chuck members radially slidable in said radial holes respectively, said chuck members having outer end portions projecting radially outwardly of said chuck holding member and inner end portions having teeth engaging said spiral groove on the outer face of said disc portion, whereby said chuck member are movable radially outwardly by rotation of said chuck holding member relative to said disc portion for engagement of said radially projecting outer end portions with the inner peripheral surface of said workpiece at a position spaced inwardly from said open end.

* * * * *